United States Patent
Durst et al.

[15] 3,700,707
[45] Oct. 24, 1972

[54] TITANIUM TRIHALIDE-AMINE HYDROHALIDE COMPLEXES

[72] Inventors: Richard R. Durst, Stow; Heinz Uelzmann, Cuyahoga Falls, both of Ohio

[73] Assignee: The General Tire & Rubber Company, Akron, Ohio

[22] Filed: Aug. 13, 1971

[21] Appl. No.: 171,740

Related U.S. Application Data

[62] Division of Ser. No. 824,670, May 14, 1969, Pat. No. 3,627,797, which is a division of Ser. No. 493,868, Oct. 7, 1965, abandoned.

[52] U.S. Cl. ............260/429.5, 260/242, 260/270, 260/299, 260/608
[51] Int. Cl. ..............................C07f 7/28
[58] Field of Search............260/429.5, 299, 242, 270

[56] References Cited

UNITED STATES PATENTS 3,275,636   9/1966   Knowles ............260/429.5 X

OTHER PUBLICATIONS

Chemical Abstracts, Vol. 62, 1309b (1965)
Antler et al. " J.A.C.S." Vol. 77, pp. 5250– 5253 (1955)
Nicholls et al. " J. Chem. Soc." pg. 4204 & 4208 (1964)
Towles et al. " J. Inorg. Nucl. Chem" Vol. 18, pg. 130 (1961).

*Primary Examiner*—H. Sneed
*Attorney*—Frank C. Rote, Jr. et al.

[57] ABSTRACT

Compositions of aluminum trihydrocarbyls (triisobutyl aluminum) and titanium (III) halide-amine hydrohalide complexes are useful in the polymerization of cyclic oxides such as ethylene oxide, allyl glycidyl ether, propylene oxide, oxetane and the like. The complex has the formula $YH^+(TiX_4)^-$ where Y is an amine having up to 20 carbon atoms and a pK value of not greater than 12, X is halogen and Ti has a valence of three and is prepared by reacting a mercaptan and an amine with a titanium tetrahalide. The resulting complex and disulfide can be separated from each other by virtue of their different solubilities.

9 Claims, No Drawings

TITANIUM TRIHALIDE-AMINE HYDROHALIDE COMPLEXES

This application is a division of prior copending U. S. Pat. application of Richard R. Durst and Heinz Uelzmann, Ser. No. 824,670, filed May 14, 1969 and entitled "Titanium Halide-Mercaptan And Titanium Halide-Amine Hydrohalide Complexes, Their Preparation And Use," now U. S. Pat. No. 3,627,797, patented Dec. 14, 1971, which in turn is a division of U. S. Pat. application of Richard R. Durst and Heinz Uelzmann, Ser. No. 498,868, filed Oct. 7, 1965 and entitled "Titanium Complexes," now abandoned.

SUMMARY OF THE INVENTION

The present invention relates to a method for the polymerization of cyclic oxides to form polyether polymers using as catalysts a titanium trihalide-amine hydrohalide complex and an aluminum trihydrocarbyl compound.

It has been discovered that, when conducting Ziegler-type ionic polymerizations of unsaturated compounds or cyclic oxides, polymers of higher molecular weight are often obtained by replacing the titanium tetrahalide with an amine hydrochloride complex produced by reducing a titanium tetrahalide with a mercaptan and an amine and separating the resulting disulfide from the complex. Such amine hydrochloride complex of the titanium trihalide, when added to a suitable metal trihydrocarbyl such as a trialkyl aluminum compound, provides a very effective catalyst. Such catalyst is particularly advantageous in producing polypropylene of high molecular weight.

The process of the present invention involves reacting a tetravalent metal halide, such as titanium tetrachloride, with a mercaptan and with an amine having sufficient strength to reduce the titanium tetrachloride to form the III-valent titanium complex. The reaction of the titanium tetrahalide with the mercaptan produces an intermediate complex acid of the formula $(TiCl_4SR)^-H^+$ which apparently reacts with the amine. This complex acid is useful as an intermediate in the preparation of the disulfide corresponding to the mercaptan while at the same time being useful as an intermediate in the formation of the amine hydrochloride complex-catalyst of this invention. The titanium tetrahalide plus the amine provide a means for oxidizing the mercaptan to form the disulfide.

The disulfide can readily be separated from the amine hydrochloride complex of this invention, and such complex can be used in a Ziegler-type ionic polymerization to effect polymerization of various monomers, preferably in conjunction with a metal alkyl, such as a trialkyl aluminum compound. The polymerization may be carried out in a conventional manner using an amount of the catalyst sufficient to effect the desired polymerization.

OBJECTS

An object of the invention is to provide a more effective ionic polymerization catalyst for solution polymerizations.

Another object of the invention is to provide effective methods for converting mercaptans to disulfides.

A still further object of the invention is to provide a simple inexpensive process for making effective polymerization catalysts.

Another object of the invention is to provide processes for reducing a tetravalent metal compound, such as a titanium tetrahalide or the like, to the trivalent state.

These and other objects, uses and advantages of the invention will become apparent from the description and claims which follow.

DISCUSSION OF DETAILS

In practicing the process of the present invention, there are employed a tetravalent metal halide (i.e., titanium tetrachloride), a mercaptan or the like preferably having no more than 20 carbon atoms, and an amine preferably having no more than 20 carbon atoms. The invention provides a method of oxidizing a mercaptan of the formula RSH, where R is an organic radical (i.e., alkyl, aryl, heteroalkyl, etc.), to form the corresponding disulfide, RSSR. This may be accomplished by simultaneous reaction of the titanium tetrahalide, the mercaptan and the amine or by reacting the ingredients in more than one step. Two alternatives are described below.

A titanium tetrahalide is an electron acceptor and forms a stable coordination complex of the formula $[TiX_4]Y$ when reacted with various amines, each X being a halogen, such as chlorine or iodine, and Y being an amine, such as hydrazine or any other amine having preferably one to 20 carbon atoms. According to the present invention a mercaptan can be oxidized to form the corresponding disulfide as follows:

(I) $2Y[TiX_4] + 2RSH \rightarrow 2YH^+(TiX_4)^- + RSSR$

A disproportionation reaction according to this formula (I) may also be employed to reduce the metal tetrahalide to the trivalent state and thereby form the amine hydrohalide catalyst complex of this invention. It is preferably to effect the disproportionation at an elevated temperature to obtain a high degree of reduction and to employ amines stronger than phenothiazine, such as those with a pK valve no greater than 12 as explained hereinafter.

Instead of adding the mercaptan to a preformed coordination complex to form the catalyst of this invention, the mercaptan can be reacted with the metal tetrahalide to form an intermediate complex acid which is thereafter reacted with the amine to effect disproportionation according to the following postulated equations:

(II) $TiX_4 + RSH \rightarrow (TiX_4Sr)^-H^+$ 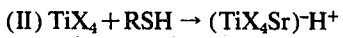

(III) $2(TiX_4SR)^-H^+ + 2Y \rightarrow 2(TiX_4SR)^-YH^+ \rightarrow 2YH^+$ 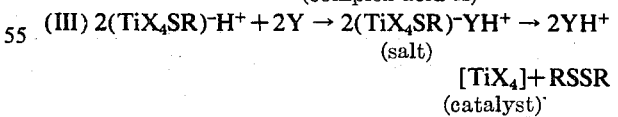

Thus, titanium tetrachloride can be reacted with an organic mercaptan in a suitable anhydrous solvent, such as n-heptane or benzene, to form the complex acid which can be isolated by evaporation of the solvent. Such complex is useful as an intermediate in the formation of other compounds as indicated previously. When it is desired to reduce the titanium tetrachloride to the trivalent state as well as to form the disulfide, RSSR, then the anhydrous amine used in reaction (III) should be strong enough to effect such reduction (i.e., substantially stronger than phenothiazine and preferably with a pK value no greater than 12). A wide range of temperatures may be used to effect the reaction, but it is convenient to speed up the reaction by using an elevated temperature, such as the boiling point of the solvent. Separation of the complex titanium catalyst of this invention, $YH^+(TiX_4)^-$, from the disulfide is easily effected because the former precipitates while the latter goes into solution. When placed in water, such precipitate hydrolyzes. Because the amine hydrochloride complex of this invention hydrolyzes to form $TiCl_3 \cdot 6H_2O$, the process of this invention provides a novel method of making the latter compound.

As pointed out in more detail hereinafter, the amine hydrohalide complex of this invention is most effective as an ionic catalyst for bulk or solution polymerizations when used in conjunction with aluminum trialkyls or the like as in Ziegler-type polymerizations. Also, it is most effective and tends to produce polymers of higher molecular weight when free of impurities, such as the above-mentioned disulfide or molar excesses of the mercaptan or the amine. Thus, it is preferred to react one mole of the titanium tetrahalide simultaneously with only 1 mole of the mercaptan and only 1 mole of the amine under conditions which readily provide a quantitative yield according to the equations (II) and (III), although a satisfactory catalyst can be obtained with molar excesses of any of the three reactants and with a wide range of reaction conditions.

In the above equations (I) to (III), the radical R of the mercaptan, RSH, preferably is a hydrocarbon radical and preferably contains one 20 carbon atoms (usually two to 10 carbon atoms). More specifically, the radical R can be, for example, any alkyl radical such as the methyl, ethyl, isopropyl, tert-butyl, hexyl, 2-ethylhexyl, dodecyl, octadecyl or myricyl radical; any alkenyl radical such as the vinyl, allyl or octadienyl radical; any cycloalkyl radical such as the cyclopentyl or cyclohexyl radical; any cycloalkenyl radical such as the cyclopentenyl, cyclohexenyl or cyclohexadienyl radical; any aryl radical such as the phenyl, naphthyl or xenyl radical, any alkaryl radical such as the tolyl or dimethylphenyl and any aralkyl radical such as the benzyl or xylyl radical.

Examples of useful mercaptans or sulfur compounds are as follows: methyl mercaptan, ethyl mercaptan, isobutyl mercaptan, tertbutyl mercaptan, allyl mercaptan, hexyl mercaptan, tertdodecyl mercaptan, hexadecyl mercaptan, octa-decyl mercaptan, lauryl mercaptan, 2-mercaptobenzothiazole, 2-methyl mercapto benzothiazole, phenyl mercaptan, benzyl mercaptan, amyl mercaptan, isoamyl mercaptan, o-mercapto benzyl acid, furfuryl mercaptan, cyclohexyl mercaptan, methylcyclohexylene mercaptan, cyclohexyl methylene mercaptan, phenylcyclobutylene mercaptan, alpha-naphthyl mercaptan, beta naphthyl mercaptan, and o-tolyl mercaptan and the like. Mixtures of these sulfur compounds and various homologues can be used. It is generally preferred to employ liquid mercaptans or sulfur compounds which boil at a temperature of 20° to 200° C.

The amine used in the process of this invention can be an aliphatic or aromatic amine, either primary, secondary or tertiary, and preferably has a pK value less than 12. Compounds having secondary or tertiary amino groups are preferred. Various mono-, di- and tri- amines may be used. The amines preferably have one to 20 carbon atoms and usually two to 10 carbon atoms. Examples of suitable amines are as follows: nicotine, o-nitroaniline, m-nitroaniline, p-nitroaniline, ϵ-phenylamyl-amine, δ-phenylbutylamine, o-phenylene-diamine, p-phenylene diamine, β-phenylethylamine, β-phenylethyl-methylamine, phenylhydrazine, γ-phenylpropylamine, piperazine, piperidine, n-propylamine, iso-propylamine, pyridine, quinoline, spartene, tetramethylene diamine, thiazole, o-toluidine, m-toluidine, p-toluidine, triiso-butylamine, triethylamine, trimethylamine, trimethylene-diamine, tripropylamine, triphenylamine, iso-amylamine, aniline, benzylamine, benzidine, n-butylamine, iso-butylamine, tert-butylamine, p-bromoaniline, conine, di-iso-amylamine, di-iso-butylamine, diethylamine, diethylbenzylamine, dimethylamine, dimethylbenzylamine, dimethylaniline, o-chloroaniline, m-chloraniline, p-chloroaniline, di-phenylamine, dipropylamine, ethylamine, ethylenediamine, hydrazine, methylamine, o-methyl-benzylamine, m-methylbenzylamine, o-methyl-benzylamine, N,N-methylbenzylamine, methylaniline methyldiethylamine, α-naphthylamine, β-naphthylamine, N-phenyl-o-phenylenediamine, phenylenediamine, diaminobenzophenane, diaminodiphenyl, diaminodiphenyl amine, diaminodiphenylmethane, diaminobutane, triaminobenzene, triaminochlorobenzene, triaminophenol, triaminotoluene, and triaminotriphenylmethane. Mixtures of these amines and various homologues are also suitable.

It is generally preferred to use one or more organic amines having the formula

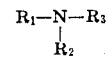

where $R_1$, $R_2$ and $R_3$ are radicals selected from the group consisting of alkyl, aryl, alkaryl, cycloalkyl and hydrogen radicals. Satisfactory results can be obtained using halogen-substituted or nitro-substituted amines having preferably one to 10 carbon atoms or substituted anilines, pyridines or quinolines, particularly those with one methyl substituent. These and other variations will readily become apparent to those skilled in the art from this disclosure. In practice, it is usually preferable to employ common amines, such as pyridine, quinoline, triethylamine, n-butyl amine or the like or amines having no more than 10 carbon atoms.

Obviously when using amines having substituent groups, such groups should not be of a type which could interfere with the oxidation of the mercaptan or the reduction of the titanium to the III-valent state or which could interfere with the function of the amino nitrogen atom or react with the tetrahalide. It is preferably to employ an amine which is essentially free of hydroxyl groups, carboxyl groups, isocyanato groups or other groups which could possibly interfere with the reaction and which is sufficiently strong to reduce the tetrahalide to the III-valent state.

As indicated above, when making the catalyst of this invention, the amine preferably has a pK value no greater than 12. Such value is defined as log (1/K), where K is the ionization constant, as is well understood in the art.

In the reactions indicated by the equations (I) to (III) above, the reaction conditions and the mole ratios may vary over a wide range. While equal moles of the metal tetrahalide, the mercaptan and the amine give best results, molar excesses of each reactant can be used. Molar excesses of the mercaptan or the amine decrease the effectiveness of the catalyst but obviously may be used. Preferably no less than 0.5 mole and no more than 1.5 mole of the mercaptan or the amine are employed per mole of the titanium tetrahalide. The temperature of the reaction is not critical and external heating may be employed where it is desired to speed up the reactions, which are sometimes exothermic. While an open system can be used, the reactions preferably take place in a closed reactor in a dry inert atmosphere.

Although an amine hydrohalide complex, such as YH+(TiX$_4$ is a polymerization catalyst when used alone, it is most effective when used in conjunction with a metal trialkyl or the like. It is well known in the art, since the development of Ziegler-type catalysts, that effective catalyst combinations are obtained using chlorides, bromides or iodides of tetravalent metals, such as titanium or vanadium, complexed with metal alkyls or the like, such as aluminum trihydrocarbyls. The present invention uses a generally similar ionic polymerization system but replaces the metal tetrahalide with the novel amine hydrohalide titanium complex described above. Thus, the catalyst combination may be formed simply by mixing an aluminum alkyl or the like with said complex.

The aluminum trihydrocarbyl employed with the amine hydrohalide titanium complex of this invention may be any of the aluminum compounds which are known to be useful for Ziegler-type polymerizations. Such aluminum trihydrocarbyl has three monovalent hydrocarbon radicals, each containing preferably from one to 20 carbon atoms, and is preferably an aluminum alkyl having the formula AlR$_3$, where each R is preferably an organic radical having one to 20 carbon atoms (usually one to 10 carbon atoms). Examples of useful organo-aluminum compounds falling within the above formula are triethyl aluminum, trimethyl aluminum, triphenyl aluminum, tributyl aluminum, trimethyl aluminum, trinonyl aluminum, tripentyl aluminum, triacetyl aluminum, tritolyl aluminum, diphenyl methyl aluminum, tricyclobutyl aluminum, tri(trimethylcyclohexyl) aluminum, methyldiethyl aluminum, triisobutyl aluminum and the like. Mixtures of these compounds and various homologues may, of course, be used also.

The catalyst of this invention may be used in the form of a mixture, complex or reaction product and is preferably preformed before being added to the polymerizable monomers by mixing or reacting the amine hydrohalide titanium complex with the aluminum trihydrocarbyl. The mol ratio of said complex to said aluminum compound may vary over a very wide range and is selected to give the reactivity needed. Such mol ratio is preferably no less than 0.2:1 and no greater than 4:1. The mol ratio may vary widely depending on the polymerization conditions, the types of monomers being polymerized, the concentration of particular monomers and so forth.

Although the catalyst of this invention can be used to effect bulk polymerizations, it is primarily intended to initiate ionic solution polymerizations of organic cyclic oxides, such as ethylene oxide, propylene oxide or other alkylene oxides, or ethylenically unsaturated compounds, such as ethylene or aliphatic, cycloaliphatic or aromatic hydrocarbon-substituted ethylenes having preferably no more than 20 carbon atoms. The preferred monomers usually have two to 10 carbon atoms.

The catalyst combination of this invention is effective for ionic solution polymerization (homopolymerization or copolymerization) of various olefinic and diolefinic compounds having two to 20 carbon atoms, such as butadiene, ethylene, propylene, styrene, isoprene, chloroprene, acrylonitrile, divinyl benzene, or mixtures thereof. The olefin monomers to be polymerized with the catalyst combination include compounds of the formula H$_2$C=CHR, where R is hydrogen or an aliphatic, cyclohaliphatic or aromatic hydrocarbon radical saturated or unsaturated having preferably one to 10 carbon atoms. The diolefins can be used in various amounts with the olefins to obtain copolymers with the desired degree of unsaturation for curing or crosslinking with sulfur or other crosslinking agents.

The catalyst combination of this invention is also effective in producing high molecular weight polymers from organic cyclic oxide monomers, such as those having one or more oxygen-carbon rings with two to six carbon atoms and an oxygen atom which will open to permit polymerization with the same or other cyclic oxide monomers. These cyclic oxides may be saturated or unsaturated (containing one or more aliphatic carbon-to-carbon double bonds), and mixtures of various cyclic oxides may be used. Thus there can be used cyclic oxides such as epoxides, di-epoxides polyepoxides, oxetanes, furans, pentamethylene oxides, hexamethylene oxides, and the corresponding unsaturated cyclic oxides, their alkyl, aryl, aralkyl, alkaryl, and cycloaliphatic substituted derivatives and their halogen, ether and ester containing derivatives and the like. Some specific examples of useful cyclic oxides are oxirane; ethylene oxide; propylene oxide; butene oxide; dodecene oxide; isobutylene oxide; butadiene monoxide; sytrene oxide; allyl glycidyl ether; vinyl cyclohexene monoxide; vinyl cyclohexene dioxide; 3-methyl-3,4-epoxy butene-1; 1,2-diisobutylene oxide; 2,3-diisobutylene oxide; phenyl glycidyl ether; isoprene monoxide; glycidyl methacrylate; tetrahydrofuran; oxetane (C$_3$H$_6$O); 3,3-diethyl oxetane; 3-ethyl-3butyl oxetane; 3,3-dimethyl oxetane; 3,3-di(chloromethyl) oxetane; 3-methyl-3- chloromethyl oxetane; diglycidyl ether of pentanediol; 3-ethyl-3-methyl oxetane; dihydrofuran; dicyclopentadiene monoxide; the reaction product of the diglycidyl ether of pentane diol and bisphenol A; limonene dioxide; bis-1,1'-(3,4-epoxy-6-methyl phenyl) methyl formate; diglycidyl ether of a polyalkylene or arylene ether glycol; tetrahydrofurfuryl laurate; 1,4-dichloro-2,3-epoxy butane; alpha methyl furan; dimethyl furan; furan; hexamethylene oxide; pyran, tetrahydropyran; benzopyran and the like. Those compounds with two to 12 carbon atoms and a vicinal epoxy group are preferred.

The alkylene oxide monomers, olefins or diolefins mentioned above are preferably polymerized in organic liquids which are non-reactive and in which the monomer will dissolve or disperse. Examples of suitable solvents for the monomers include toluene, benzene, heptane, octane, xylene, trichloro-ethylene, cyclohexane, dioxane, and naphtha. Non-polar solvents are preferred. The solvent is used in amounts sufficient to obtain the desired fluidity in the system and to properly dissolve and disperse the monomer and polymer. Sufficient solvent should be used to provide an adequate medium for polymerization, for dispersion of the catalyst, suspension of the polymer and solution of the monomer as is well understood in the art.

While the solution polymerization may be conducted in an open system, it is preferred to conduct the polymerization with agitation in a closed system, preferably under pressure. The monomers may be polymerized in an autoclave or pressure reactor under an inert or non-oxidizing atmosphere, such as an atmosphere of nitrogen, neon or helium. The polymerization conditions may be generally the same as in a conventional Ziegler-type polymerizations, the temperature and pressure preferably being high enough to effect the polymerization at a reasonable speed. Polymerization is usually conducted at temperatures above 0° C., preferably from about 10° to 100° C., which are selected to produce a polymer of the desired molecular weight. A catalytically significant amount of the catalyst of this invention is employed, preferably in an amount sufficient to produce a polymer of the desired high molecular weight. Usually at least 1 mole of catalyst should be used for each 700 moles of the monomers.

The polymerization conditions may be generally as described in the copending application of Robert J. Herold, Ser. No. 29,567, filed May 17, 1960, now abandoned, except that a different catalyst is employed. Thus, when polymerizing mixtures of different monomers, the monomers may be introduced into the reactor at different times during the polymerization if desired.

The process of this invention using the titanium complex and the aluminum trialkyl produces polymers having a high molecular weight useful in making various products (i.e., shoe soles or heels, floor mats, adhesives, lubricants, molded rubber articles, tires and the like). The polymers may be compounded with various compounding ingredients such as fillers, extenders, plasticizers, antidegradants, etc. as will become apparent to those skilled in the art. In general, the polymers of this invention can be used like polymers mad by the known Ziegler-type polymerization processes.

EXAMPLES

The following examples will serve to illustrate the invention with more particularity to those skilled in the art.

Example I (Reaction of Titanium Tetrachloride with Phenyl Mercaptan)

To a nitrogen-flushed, 500ml. three-necked, round bottom flask equipped with a stirrer, reflux condenser, dropping funnel and a source of lamp grade nitrogen was added 0.1 mole (18.97 gms.) of titanium tetrachloride (TiCl$_4$). To the titanium tetrachloride was added rapidly 0.1 mole (11 gms.) of phenyl mercaptan form a dropping funnel. The component were mixed, and the mixture turned a deep reddish-purple while extherming to 45° C. After agitating the mixture 15 minutes by stirring, the mixture became a crystalline solid. Benzene was added to dissolve the solid. Titration of the solution showed that only 4 percent of the theoretical chlorine was emitted, indicating that an addition complex salt of the structure TiCl$_4$SC$_6$H$_5^-$H$^+$ had formed.

Hydrolysis of the complex salt resulted in the formation of ortho-titanic acid, Ti(OH)$_4$, HCl and phenyl mercaptan.

EXAMPLE II (Reaction of Titanium Tetrachloride in Benzene with Phenyl Mercaptan and Quinoline)

To a nitrogen-flushed, 500 ml., three-necked, round bottom flask equipped with a paddle stirrer, reflux condenser, dropping funnel and a source of nitrogen was added 0.1 mole (18.97 gms.) of titanium tetrachloride in 100 ml. of sodium-dried benzene. Phenyl mercaptan in the amount of 0.1 mole (11 gms.) was added rapidly from a dropping funnel to said flask. The product thus formed was a complex salt of the structure TiCl$_4$SC$_6$H$_5^-$H$^+$ as in Example I and a reddish-purple solution was obtained. To this solution was obtained. To this solution was added dropwise 0.1 mole (12.915 gms.) of quinoline in 25 ml. of dry benzene. A deep green-colored precipitate formed as the reaction mixture exothermed to 45° C.

The above product was hydrolyzed by adding 200 ml. of distilled water. Two layers appeared, a benzene layer and a dark-violet water layer. The water layer contained TiCl$_3$·6H$_2$O and the amine hydrochloride.

EXAMPLE III (Reaction of Titanium Tetrachloride in Benzene with Phenyl Mercaptan and Pyridine)

Using the procedure described in the above Examples, 0.11 mole (20.87 gms.) of titanium tetrachloride in 87.9 gms. of benzene and 0.11 mole (12.1 gms.) of phenyl mercaptan in 43.95 gms. of benzene were added to the flask. The wine-colored solution was agitated at room temperature for 30 minutes before 0.10 mole (7.91 gms.) of pyridine in 43.95 gms. of benzene was added dropwise to the solution. The temperature o the reaction rose to 45° C. The reaction mixture was refluxed at 80 ° C. for 1 hour. A green colored precipitate formed evidencing the formation of the titanium salt. After cooling to room temperature (25° C. ), distilled water in the amount of 250 ml. was mixed with the mixture in the flask and two liquid layers were obtained, a benzene layer and an aqueous layer.

To test for Ti$^{+++}$, the deep violet water layer was run directly from a separating funnel into a 16 oz. bottle containing 75 gms. of ferric ammonium sulfate. Then 10 mls. of concentrated sulfuric acid were added to the mixture to help dissolve the salt. Titration of the ferrous (Fe$^{++}$) ion milliequivalents by standardized ceric sulfate solution milliequivalents by standardized ceric sulfate solution indicated a 96.7 percent reduction of the Ti$^{++++}$ to the Ti$^{+++}$ valent state.

Distillation of the benzene layer left diphenyl disulfide (90 percent recovery).

EXAMPLE IV (Reaction of Titanium Tetrachloride in Benzene with Phenyl Mercaptan and Triethylamine)

Using the procedure of Examples I and II, 0.11 mole (20.87 gms.) of titanium tetrachloride in 87.9 gms. of benzene and 0.11 mole (12.1 gms.) of phenyl mercaptan in 43.95 gms. of benzene were added to the flask. The mixture was agitated, and 0.10 mole (12.1 gms.) of triethylamine added dropwise at such a rate as to raise the temperature of the mixture to 50° C. The mixture became black and viscous as the amine was added. The mixture was refluxed at 80° C. for 1 hour, whereupon a viscous dark-brown liquid formed that was insoluble in the benzene. The mixture was treated with 200 ml. of distilled water, which resulted in the formation of a deep-purple water layer and the benzene layer.

Titration of the water layer as in Example III indicated 100° percent formation of the $Ti^{+++}$ complex. Distillation of the benzene resulted in recovery of 98 percent of the disulfide.

EXAMPLE V

The process of Example IV was repeated except that to the flask containing 0.1 mole (18.97 gms.) of titanium tetrachloride were added 0.1 mole (11 gms.) of phenyl mercaptan in 87.9 gms. of benzene and 0.1 mole (26.95 gms.) of tri-n-hexylamine in 22 gms. of benzene. The temperature of reaction rose from 30° to 45° C., 200 ml. of water were added, and the water layer and benzene layer formed. After separation of the liquid layers, titration of the water layer indicated a 78 percent reduction of the $Ti^{++++}$. Distillation of the benzene resulted in a yield of nearly 70 percent of the disulfide.

EXAMPLE VI

The same process and amounts used in Example V were used, except that n-butylamine was used to replace the tri-n-hexylamine. After treatment with water, titration of the water layer indicated 80 percent reduction of $Ti^{++++}$ to $Ti^{+++}$.

EXAMPLE VII

Using the procedure described in Examples I and II, 1.0 mole (189.74 gms.) of titanium tetrachloride dissolved in 350 mls. of dry benzene and 1.0 mole (90.18 gms.) of n-butyl-mercaptan were charged into the flask. A solution of 200 mls. of dry benzene containing 1.0 mole (79 gms.) of dry pyridine was added dropwise, keeping the temperature between 50°–55° C. by cooling with an ice bath. A green precipitate was formed. The mixture was refluxed at 80° C. for 2 hours. The precipitate was filtered under nitrogen through a glass-sintered filter in a separatory funnel, repeatedly washed with dry benzene, and then dried in a stream of nitrogen. The yield of the green complex was almost quantitative.

The benzene solution was vacuum-distilled to produce nearly quantitative amounts of di-n-butyldisulfide, which had a boiling point of 100° to 103° C. at 15 mm pressure.

EXAMPLE VIII (Preparation of Polyethylene)

Into a pressure reactor which was connected to a source of gaseous ethylene monomer under 20 pounds of constant pressure were charged 1.0 millimole (0.27 gram) of the titanium complex as described in Example III 3.0 millimoles of triisobutyl aluminum and 400 ml of n-heptane solvent. Polymerization was effected under a nitrogen atmosphere at a temperature of 30 ° C. for 4 hours. The polymer (3 grams) formed had a high molecular weight as indicated by an inherent viscosity of 8.07 measured in benzene at 25° C.

EXAMPLE IX (Preparation of Polypropylene)

The method of preparation used in this example was similar to that of Example VIII, above, except that the monomer was propylene. The resulting polypropylene had an exceptionally high molecular weight as evidenced by an inherent viscosity of 2.75 measured at 25° C. in benzene.

EXAMPLE X (Preparation of Polypropylene Ethers)

| Amounts | Materials |
|---|---|
| 500.0 millimoles | Propylene Oxide Monomer |
| 2.0 millimoles | Titanium Salt of Example III |
| 6.0 millimoles | Triisobutyl Aluminum |
| 500.0 ml. | Benzene Solvent |

The above components were charged to a pressure reactor and polymerized. The polymerization reaction was run at a temperature of 80° C. for 72 hours. The resulting polymer, which was the consistency of grease, has an inherent viscosity of 0.49 in benzene at 25° C. The yield of polymer was 70.4 percent.

EXAMPLE XI

| Amounts | Materials |
|---|---|
| 50 gms. | 1,3-butadiene monomer |
| 500.00 mls. | Toluene solvent |
| 7.43 millimoles | Titanium salt complex |
| 5.24 millimoles | Triisobutyl aluminum |

The method of Example X was repeated. To the butadiene monomer in the solvent were added the titanium salt complex and triisobutyl aluminum. The polymerization reaction was run at a temperature of 30° C. for 24 hours. The resulting polymer had an inherent viscosity of 1.08 at 25° C. in benzene.

The catalyst of this invention is superior to ordinary Ziegler catalysts in several respects. Thus, the polyethylene and polypropylene made in accordance with the above Examples VIII and IX had a higher molecular weight than similar polymers made from an ordinary Ziegler catalyst such as one made from one mol of titanium tetrachloride and one mol of triisobutyl aluminum. Another difference is that the polymers of this invention coagulated into one large mass in the reactor, whereas, the polymers formed using the ordinary Ziegler catalyst had the appearance of fine sand which gradually coagulated into larger particles. On removal from the reactor, the polymer of this invention was found to be more fibrous and less soluble in hot tetralin than the polymer formed from the ordinary Ziegler catalyst.

It will be understood that, in accordance with the provisions of the patent statutes, variations and modifications of the subject invention may be made without departing from the spirit thereof.

What is claimed is:

1. The method which comprises reacting a $TiX_4$, a RSH and an organic amine to form a complex having the formula $YH^+(TiX_4)^-$ and RSSR, and separating said complex from the disulfide where
   a. X is halogen,
   b. R is a hydrocarbon of from one to 20 carbon atoms,
   c. Y is said amine having a pK value of not greater than 12 and from one to 20 carbon atoms, and
   d. Ti in $YH^+(TiX_4)^-$ has a valence of 3.

2. The method according to claim 1 wherein the $TiX_4$ and the RSH are first reacted to form an intermediate compound having the formula $(TiX_4SR)^-H^+$ which is then reacted with the organic amine to form the complex and the disulfide.

3. The method according to claim 1 wherein the $TiX_4$ and the organic amine are reacted to form an intermediate compound having the formula $(TiX_4)Y$ which is then reacted with the RSH to form the complex and the disulfide.

4. The method as defined in claim 1 wherein X is chlorine.

5. The method as defined in claim 4 wherein Y is a heterocyclic amine.

6. The method as defined in claim 4 wherein Y is an organic amine having the formula

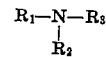

where $R_1$, $R_2$ and $R_3$ are radicals selected from the group consisting of alkyl, aryl, alkaryl, aralkyl, cycloalkyl and hydrogen, not more than two of the Rs being hydrogen.

7. The method as define in claim 1 wherein Y is a halogen-substituted amine having from one to 10 carbon atoms.

8. The method as defined in claim 1 wherein Y is a nitro-substituted amine having one to 10 carbon atoms.

9. The method as defined in claim 1 wherein Y is a secondary or tertiary amine.

* * * * *

UNITED STATES PATENT OFFICE
CERTIFICATE OF CORRECTION

Patent No. 3,700,707　　　　　Dated October 24, 1972

Inventor(s) Richard R. Durst and Heinz Uelzmann

It is certified that error appears in the above-identified patent and that said Letters Patent are hereby corrected as shown below:

Column 1, line 11, the number "498,868" should read ---493,868---.

Column 2, line 40, the word "preferably" should read ---preferable---; line 43, the word "valve" should read ---value---; line 57, the formula "$[TiX_4]+RSSR$" should read ---$[TiX_4]^-+RSSR$---.

Column 3, line 54, the word "benzyl acid" should read ---benzoic acid---.

Column 4, line 59, the word "preferably" should read ---preferable---.

Column 5, line 18, the formula "$YH+(TiX_4$" should read ---$YH+(TiX_4)-$ ---; line 46, the word "trimethyl aluminum" should read ---trihexyl aluminum---.

Column 7, line 52, the word "mad" should read ---made---.

Column 8, line 51, the word "o" should read ---of---; line 66 delete "sulfate solution milliequivalents by standardized ceric".

Column 9, line 11, the phrase "(12.1 gms.)" should read ---(10.119 gms.)---; line 21, the number "100°" should read ---100---.

Signed and sealed this 19th day of February 1974.

(SEAL)
Attest:

EDWARD M. FLETCHER, JR.　　　　C. MARSHALL DANN
Attesting Officer　　　　　　　　Commissioner of Patents